US006571240B1

(12) United States Patent
Ho et al.

(10) Patent No.: US 6,571,240 B1
(45) Date of Patent: May 27, 2003

(54) INFORMATION PROCESSING FOR SEARCHING CATEGORIZING INFORMATION IN A DOCUMENT BASED ON A CATEGORIZATION HIERARCHY AND EXTRACTED PHRASES

(76) Inventors: Chi Fai Ho, 965 Astoria Dr., Sunnyvale, CA (US) 94087; Peter P. Tong, 1807 Limetree La., Mountain View, CA (US) 94040

( * ) Notice: Subject to any disclaimer, the term of this patent is extended or adjusted under 35 U.S.C. 154(b) by 0 days.

(21) Appl. No.: 09/496,863

(22) Filed: Feb. 2, 2000

(51) Int. Cl.[7] .............................................. G06F 17/30
(52) U.S. Cl. .............................. 707/5; 707/3; 707/500; 704/9
(58) Field of Search .......................... 707/5, 4, 3, 500, 707/100; 706/47; 704/9

(56) References Cited

U.S. PATENT DOCUMENTS

| 4,787,035 A | 11/1988 | Bourne ........................ 700/247 |
| 4,798,543 A | 1/1989 | Spiece ........................ 434/323 |
| 4,816,994 A | 3/1989 | Freiling et al. ................ 706/59 |

(List continued on next page.)

FOREIGN PATENT DOCUMENTS

| WO | WO 93/21587 | 10/1993 |
| WO | WO 95/02221 | 1/1995 |

OTHER PUBLICATIONS

Harris, "Primus releases SolutionBuilder," Service News, Dec., 1995.
Product information re: SolutionBuilder from Primus Communications, Help Desk Buyer's Guide, Call Center Magazine, p. 40, May 1996.
SolutionBuilder User Guide and Command Reference, Version 1.1, Primus Communications Corporation, 1995.
Lim, "Budding Businesses to Watch in '96," The Seattle Times, Jan. 28, 1996.
Baker, "Snafu–solving software at Primus attracts capital," Puget Sound Business Journal, Apr. 19–25, 1996.
Norvig, Peter, Paradigms Of Artificial Intelligence Programming: Case Studies In Common LISP, "*Student: Solving Alegbra Word Problems*," Chapter 7, Morgan Kaufmann Publishers, 1992, pp. 219–235.
Response Generation, "*Question–Answering Systems*," Chapter 16, and "*Natural Language Generation*," Chapter 17, pp. 468–513.
Burke et al., "*Knowledge–based Information Retrieval from Semi–Structured Text*," The Artificial Intelligence Laboratory, The University of Chicago, Nov. 1995.

(List continued on next page.)

*Primary Examiner*—Greta Robinson
(74) *Attorney, Agent, or Firm*—Beyer Weaver & Thomas, LLP

(57) ABSTRACT

Processing automatically information in a document to be incorporated into databases to be searched, retrieved and learned. This would significantly enhance categorizing information in the domain so that information can be systematically and efficiently retrieved when needed. In one approach, first, the context or the domain of the document is determined. Then, domain-specific phrases in the document are automatically extracted based on grammar and dictionaries. From these phrases, categories in a category hierarchy are identified, and the document is linked to those categories. Phrases in the document that cannot be categorized are identified to be analyzed. If these new phrases are relevant, new categories may be created based on suggestions provided to categorize them. Later when a user asks a question that is related to the categorized phrases, the corresponding categories are identified, with the document retrieved to respond to the question. In one approach, the question is in natural-language.

20 Claims, 12 Drawing Sheets-

U.S. PATENT DOCUMENTS

| | | | | |
|---|---|---|---|---|
| 4,847,784 A | | 7/1989 | Clancey | 706/50 |
| 4,867,685 A | | 9/1989 | Brush et al. | 434/234 |
| 4,914,590 A | | 4/1990 | Loatman et al. | 717/144 |
| 5,035,625 A | | 7/1991 | Monson et al. | 434/332 |
| 5,239,617 A | | 8/1993 | Gardner et al. | 706/11 |
| 5,259,766 A | | 11/1993 | Sack et al. | 434/362 |
| 5,265,014 A | | 11/1993 | Haddock et al. | 704/9 |
| 5,265,065 A | | 11/1993 | Turtle | 707/4 |
| 5,286,036 A | | 2/1994 | Barabash | 273/429 |
| 5,295,836 A | | 3/1994 | Ryu et al. | 434/335 |
| 5,301,314 A | | 4/1994 | Gifford et al. | 707/101 |
| 5,306,154 A | | 4/1994 | Ujita et al. | 434/218 |
| 5,309,359 A | | 5/1994 | Katz et al. | 707/102 |
| 5,384,894 A | | 1/1995 | Vassiliadis et al. | 706/52 |
| 5,386,556 A | | 1/1995 | Hedin et al. | 707/4 |
| 5,404,295 A | | 4/1995 | Katz et al. | 707/2 |
| 5,414,797 A | | 5/1995 | Vassiliadis et al. | 706/46 |
| 5,418,717 A | | 5/1995 | Su et al. | 704/9 |
| 5,423,032 A | * | 6/1995 | Byrd et al. | 707/5 |
| 5,441,415 A | | 8/1995 | Lee et al. | 434/350 |
| 5,446,883 A | | 8/1995 | Kirkbride et al. | 707/10 |
| 5,454,106 A | | 9/1995 | Burns et al. | 707/4 |
| 5,495,604 A | | 2/1996 | Harding et al. | 707/102 |
| 5,519,608 A | | 5/1996 | Kupiec | 704/9 |
| 5,581,664 A | | 12/1996 | Allen et al. | 706/46 |
| 5,586,218 A | | 12/1996 | Allen | 706/12 |
| 5,597,312 A | | 1/1997 | Bloom et al. | 434/362 |
| 5,634,121 A | * | 5/1997 | Tracz et al. | 707/2 |
| 5,652,828 A | | 7/1997 | Silverman | 704/260 |
| 5,677,835 A | | 10/1997 | Carbonell et al. | 704/8 |
| 5,677,993 A | | 10/1997 | Ohga et al. | 704/257 |
| 5,696,980 A | | 12/1997 | Brew | 704/273 |
| 5,701,399 A | | 12/1997 | Lee et al. | 706/11 |
| 5,732,395 A | | 3/1998 | Silverman | 704/260 |
| 5,749,071 A | | 5/1998 | Silverman | 704/260 |
| 5,751,906 A | | 5/1998 | Silverman | 704/260 |
| 5,754,938 A | | 5/1998 | Herz et al. | 725/116 |
| 5,754,939 A | | 5/1998 | Herz et al. | 455/3.04 |
| 5,787,234 A | | 7/1998 | Molloy | 706/46 |
| 5,794,050 A | | 8/1998 | Dahlgren et al. | 704/8 |
| 5,797,135 A | | 8/1998 | Whalen et al. | 706/53 |
| 5,819,258 A | * | 10/1998 | Vaithyanathan et al. | 707/2 |
| 5,819,260 A | * | 10/1998 | Lu et al. | 707/3 |
| 5,835,087 A | | 11/1998 | Herz et al. | 345/810 |
| 5,836,771 A | | 11/1998 | Ho et al. | 434/362 |
| 5,852,814 A | | 12/1998 | Allen | 706/13 |
| 5,884,302 A | | 3/1999 | Ho | 707/3 |
| 5,909,679 A | | 6/1999 | Hall | 707/4 |
| 5,933,531 A | | 8/1999 | Lorie | 382/229 |
| 5,933,816 A | | 8/1999 | Zeanah et al. | 705/35 |
| 5,933,822 A | * | 8/1999 | Braden-Harder et al. | 707/5 |
| 5,934,910 A | | 8/1999 | Ho et al. | 434/362 |
| 5,959,543 A | | 9/1999 | LaPorta et al. | 340/7.23 |
| 5,963,948 A | | 10/1999 | Shilcrat | 707/100 |
| 5,963,965 A | * | 10/1999 | Vogel | 707/501 |
| 5,999,908 A | | 12/1999 | Abelow | 705/1 |
| 6,076,088 A | | 6/2000 | Paik et al. | 707/5 |
| 6,078,914 A | * | 6/2000 | Redfern | 707/3 |
| 6,088,717 A | | 7/2000 | Reed et al. | 709/201 |
| 6,101,515 A | * | 8/2000 | Wical et al. | 707/531 |
| 6,160,987 A | | 12/2000 | Ho et al. | 434/350 |
| 6,263,335 B1 | | 7/2001 | Paik et al. | 707/5 |
| 6,266,664 B1 | * | 7/2001 | Russell-Falla et al. | 707/5 |
| 6,269,329 B1 | | 7/2001 | Nordstrom | 704/1 |
| 6,336,029 B1 | | 1/2002 | Ho et al. | 434/362 |
| 6,349,307 B1 | * | 2/2002 | Chen | 707/103 |
| 6,393,428 B1 | | 5/2002 | Miller et al. | 707/102 |
| 6,480,698 B2 | | 11/2002 | Ho et al. | 434/362 |

OTHER PUBLICATIONS

Woods, W.A., "Semantics And Quantification In Natural Language Question Answering," Academic Press, pp. 205–248, 1978.

Whalen, Thomas, "*Computational Behaviourism Applied to Natural Language,*" Communications Research Centre, Ottawa, ON, Apr. 1996.

Bunt, Harry C., "*Dialog Control Functions and Interaction Design,*" Institute for Language Technology and Artificial Intelligence ITK, The Netherlands (in Dialog and Instruction: Modeling and Interaction in Intelligent Tutoring Systems, Heidelberg: Springer Verlag), pp. 197–214, 1995.

Whalen, Thomas, "*CHAT Conversational Hypertext Access Technology,*" webpage: http://debra.dgbt.doc.ca/chat/info.page.html, Apr. 1993.

Unknown, "*The CHAT Natural Language System,*" webpage: http://debra.dgbt.doc.ca/chat/chat.html.

Prince, Violaine M., "*Relying on a Sophisticated Student Model to Derive Dialog Strategies in an Intelligent Tutoring System,*" Dialog and Instruction: Modeling and Interaction in Intelligent Tutoring Systems, Heidelberg: Springer Verlag, pp. 179–194, 1995.

Kaplan, S. Jerrold, "*Cooperative Responses From a Portable Natural Language Database Query System,*" Computational Models of Disclosure, MIT Press, Chapter 3, pp. 167–201, 1983.

Norvig, Peter, Paradigms Of Artificial Intelligence Programming: Case Studies In Common LISP, "*Student: Solving Algebra Word Problems,*" Chapter 7, Morgan Kaufmann Publishers, pp. 219–235.

Hendrix et al., "*Developing a Natural Language Interface to Complex Data,*" Association for Computing Machinery (ACM), 1978.

Unknown, Response Generation, "*Question–Answering Systems,*" Chapter 16, and "*Natural Language Generation,*" Chapter 17, pp. 468–513.

Burton et al., "*Toward a Natural–Language Capability for Computer–Assisted Instruction,*" Natural Language Processing, Kaufmann Publishers, pp. 605–624, 1986.

Androutsopoulos et al., "*Natural Language Interfaces to Databases–An Introduction,*" Department of Artificial Intelligence, University of Edinburgh, 1994.

* cited by examiner

INFORMATION PROCESSING FOR SEARCHING CATEGORIZING INFORMATION IN A DOCUMENT BASED ON A CATEGORIZATION HIERARCHY AND EXTRACTED PHRASES

CROSS-REFERENCE TO RELATED APPLICATIONS

This is related to co-pending U.S. patent application Ser. No. 09/387,932, filed on Sep. 1, 1999, which is incorporated by reference into this application.

BACKGROUND OF THE INVENTION

The present invention relates generally to information processing for searching and more particularly to processing documents to be integrated to a database for a search engine.

Information on the Web is growing at an astronomical rate. Just the publicly indexable Web contains more than 800 million pages of information, encompassing about 6 terabytes of text data on over 3 million servers. Though it is usually free to get information from the Web, finding the information of your interest is difficult. In order to quickly respond to a question, a good search engine typically depends on a good database of pre-processed information. In other words, processing information for a search engine is a very important task.

Existing search engines use different techniques to process information. Some companies deploy hundreds of human editors to manually categorize the documents. After the documents are correctly categorized, search engines can quickly find the appropriate responses for a question. Such human-intensive approach is an expensive and difficult task that is difficult to scale. In the long run, this approach may not be able to keep up with the information growth.

There are companies that give all relevant responses to a searcher indiscriminately. The way they prepare the documents is through key word matching techniques. They have very powerful crawlers that keep searching for information, and then providing the searchers with all documents having the same key words as in the searcher's question. There are at least two problems with such techniques. First, huge crawlers mean lots of results. If you go to such companies to search for a topic, you might get thousands of hits. The searcher has to go through all of the responses to find an answer. The second problem is that many responses are totally irrelevant to the question. For example, your questions are on fixing windows as in windows and doors. Responses might include fixing the Microsoft Windows!

To reduce the number of responses for a searcher, some companies process information by prioritizing them based on the number of sites linked to them. This approach makes it difficult for a searcher to gain access to sites not commonly accessed.

There are also companies that switch the table around. The higher a site is willing to pay them, the more frequent the site will appear in their searches. They process the information by prioritizing them based on how much the information's owner pays them. Again, such information processing techniques are not addressing users' needs of trying to quickly identify the relevant information from the huge amount of Web pages.

Another weakness in existing information processing techniques is that not only do they provide many irrelevant responses, they are typically unable to provide responses related to your questions. For example, if your question is on butter, responses typically would not include margarine.

Information processing also depends on the types of questions a search engine can respond. A trend in Web searching is the desire to search in natural-language, such as in plain English. As the Web moves into every sector of the society, a large part of the population does not feel comfortable searching by search words. It is un-natural. If the search engine depends on certain grammatical rules in a natural language, information processing for searching typically has to follow similar grammatical rules.

No matter whether the search engine is in natural language or in key words, the challenge remains. Information for a search engine has to be processed so that the engine can quickly access the growing wealth of information, and more appropriately respond to an inquiry.

It should be apparent from the foregoing that there is still a need to process information to be integrated to a database for a search engine so that the engine can quickly identify appropriate responses when the amount of information is huge and when the information is growing at an astronomical rate.

SUMMARY OF THE INVENTION

The present invention provides methods and apparatus to automatically process information to be appropriately integrated into a database for searching and retrieval. It is applicable even if the amount of information is large and is growing at a fast pace. Also, due to the invention, responses to searches are very relevant. The invention is suitable to both natural-language searches and key word searches. Web documents are used to illustrate the invention.

One embodiment first determines the context or domain of a document. Then, domain-specific phrases in the document are automatically extracted based on grammar and dictionaries. From these phrases, categories in a category hierarchy are identified, and the document is linked to the categories. Later when a question asks for information related to these phrases, the corresponding categories in the hierarchy are found, with the document retrieved to answer the question.

In the invention, there can be three different types of dictionaries: A common dictionary, a negative dictionary and a domain-specific dictionary. The negative dictionary includes phrases that should be ignored, while the domain-specific dictionary includes phrases specific to the domain. In one embodiment, the common dictionary includes phrases commonly used by the general public, and phrases in the domain-specific dictionary.

The domain-specific phrases can be linked together by a category hierarchy. It can be a structure that connects categories together, with each category having one or more phrases. The phrases can be grouped together under a category if they belong to the same concept, or if they are equivalent. Categories are grouped together in the hierarchy if they are under the same concept or if they are related categories. Categories can also be grouped together under a broader category if they have some types of order relationship.

In one embodiment, the document is automatically processed by first identifying every phrase in the document, based on the common dictionary. The identified phrases that have entries in the negative dictionary are ignored. For the remaining phrases, those with entries in the domain-specific dictionary are extracted. Any remaining phrases are new ones.

Each of the identified domain-specific phrases can be matched with phrases in the categorization hierarchy. When there is a match, the corresponding document, or the URL of the document is linked to that phrase in the categorization hierarchy.

For the new phrases, they can be referred to a human editor. If the new phrases are irrelevant, they are included in the negative dictionary. Next time when the same new phrases arise from another document, they would not be considered. However, if the new phrases are relevant, they can be added into the domain-specific dictionary. Recommendation can be given to the editor as to where to incorporate new phrases into the existing categorization hierarchy. The editor would try to link the new phrases, with the document, to existing categories. If that cannot be done, the editor may create new categories in the hierarchy. If too many documents are linked to one category, the editor may also be notified to create new categories or sub-categories. Such systematic and orderly growth of the categorization hierarchy are very useful for information organization and information retrieval.

In one embodiment, a question is transformed to one or more frequently-asked-question formats, which are linked to one or more phrases or categories in the hierarchy. To respond to the question, the documents linked to those phrases can be retrieved to be presented to the user.

Through the categorization hierarchy, new documents or information is much better organized. This will significantly reduce the amount of time required to identify relevant information to respond to questions. Also, since the categorization process is domain specific, information is organized more logically, leading to highly relevant responses to questions.

The invention is also applicable to human learning. The editor can be a student, and the categorization hierarchy can be her knowledge filing system. If a document or phrases are in an area she has learnt before, they can be automatically and systematically filed to her system. New information or phrases, automatically identified, can be referred to her to be learned. After learning, she can be suggested as to where to file the information in her existing filing system. In other words, she can link the information to what she has learnt before. Such systematic and logical learning approaches significantly help her organize new information, which, in turn, enhance knowledge retrieval in time of needs.

Other aspects and advantages of the present invention will become apparent from the following detailed description, which, when taken in conjunction with the accompanying drawings, illustrates by way of example the principles of the invention.

Same numerals in FIGS. 1–11 are assigned to similar elements in all the figures. Embodiments of the invention are discussed below with reference to FIGS. 1–11. However, those skilled in the art will readily appreciate that the detailed description given herein with respect to these figures is for explanatory purposes as the invention extends beyond these limited embodiments.

DETAILED DESCRIPTION OF THE INVENTION

The present invention can automatically process information to be appropriately incorporated into databases, which can be domain-specific. This helps a search engine quickly and accurately respond to a user's question. The information can be from documents available in a subject domain.

A document in the present invention includes information in a medium. It can be a Web document, an email message, company materials, oral commands received by a system, or other types of data in a storage medium.

For illustration purposes, the following describes processing Web site documents for a natural-language search engine. However, the invention is applicable to process other types of information for other types of search engines, such as key words search engines.

The amount of information on the Web is phenomenal. It is a difficult task to search the Web to get answer for a question. One way to provide more relevant answers and to increase the speed of response is to focus on specific domains or context. For example, if the question is in the area of computers, only computer related information will be searched. To enhance the search, computer-related information is processed beforehand for the search engine.

Figure 1:
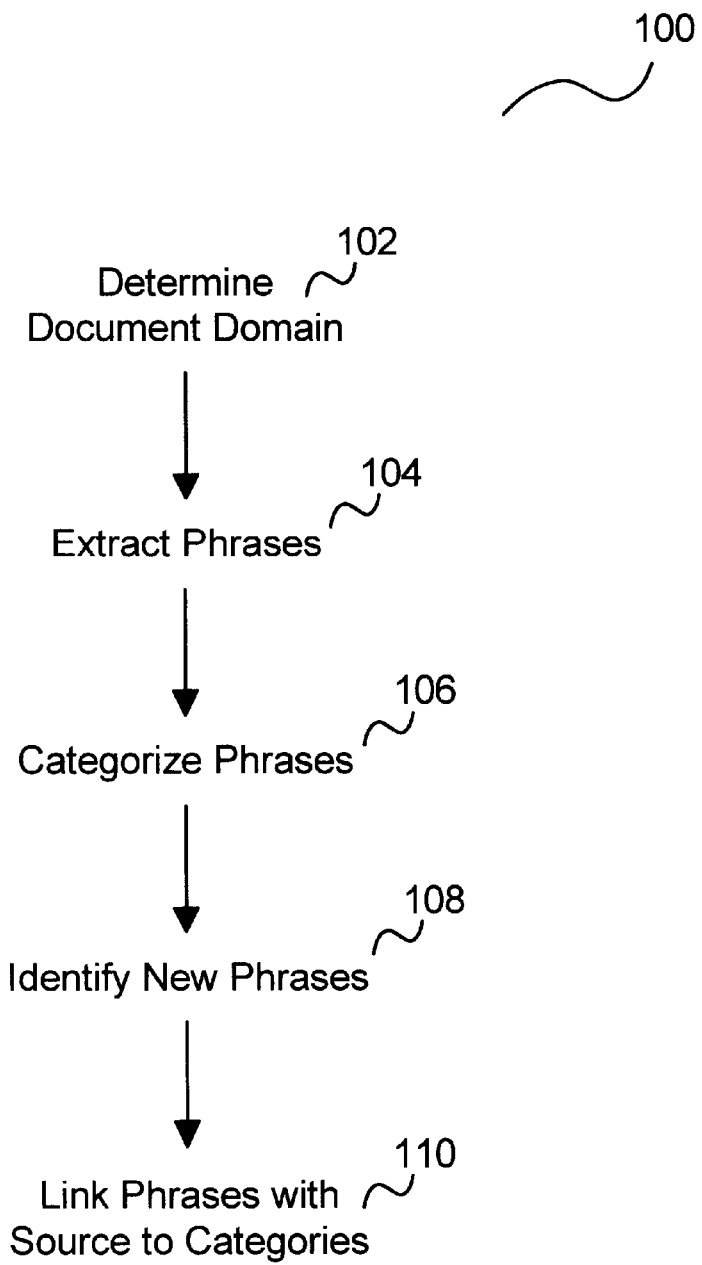
FIG. 1 shows one embodiment of the present invention.
Figure 2:
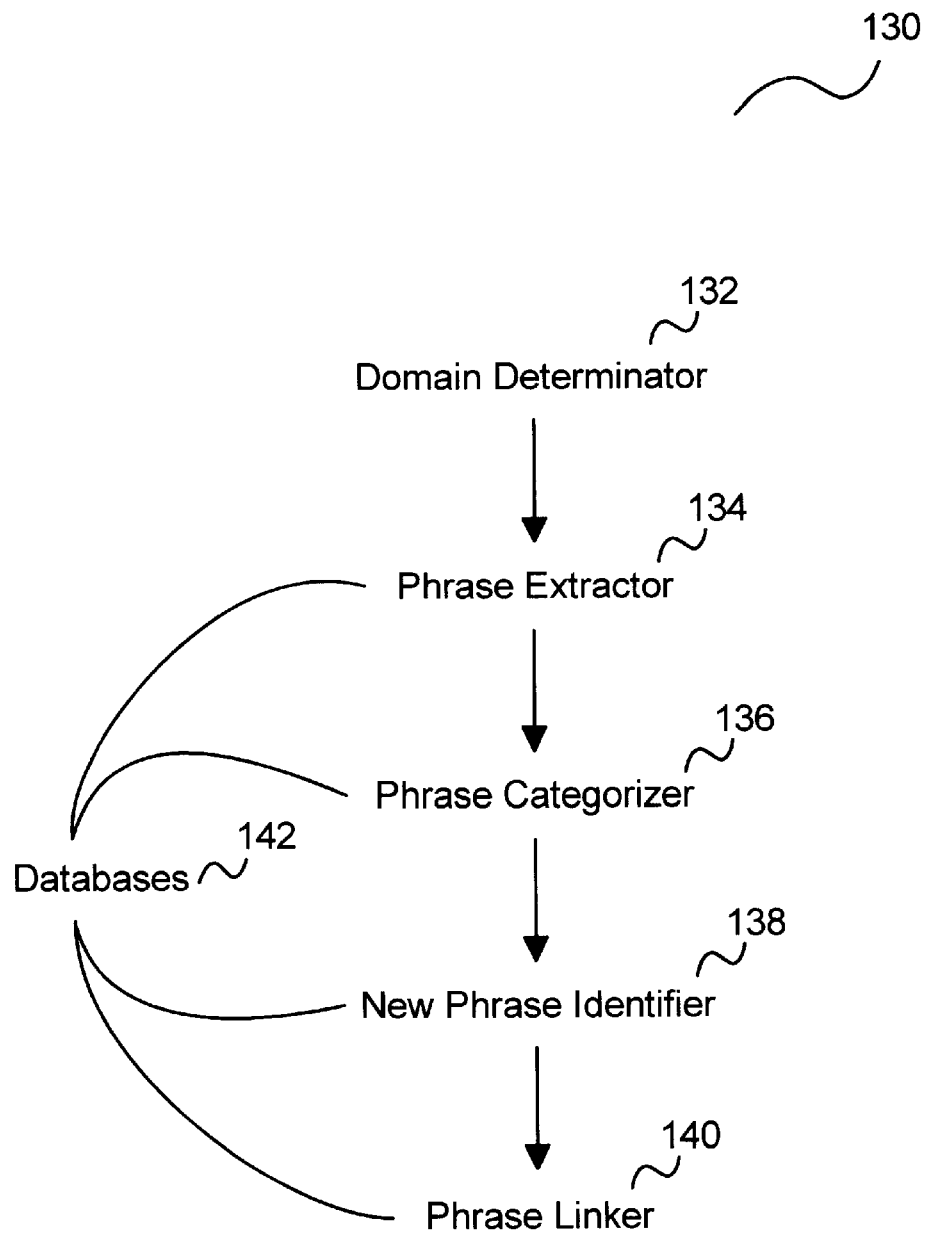
FIG. 2 shows an apparatus to implement the embodiment shown in FIG. 1.

FIG. 1 shows one embodiment, 100, of the present invention, to be implemented by the system, 130, shown in FIG. 2, to process a document. In general, first a domain determinator, 132, determines the domain or context (Step 102) of the document. After determination, a phrase extractor, 134, extracts (Step 104) phrases from the document. Then, a phrase categorizer, 146, categorizes (Step 106) at least one of the extracted phrases under a category of a categorization hierarchy. There might be one or more extracted phrases that cannot be categorized automatically. A new phrase identifier, 138, identifies (Step 108) at least one of those to be analyzed for categorization. After categorization, a phrase linker, 140, links the phrases to the categories. In one embodiment, the source of the document, such as the root URL of the Web site having the document, is also stored and linked to the categories. Based on the embodiment, information in the document can be appropriately categorized. Also, the document can be systematically retrieved by a search engine when needed.

Figure 3A:
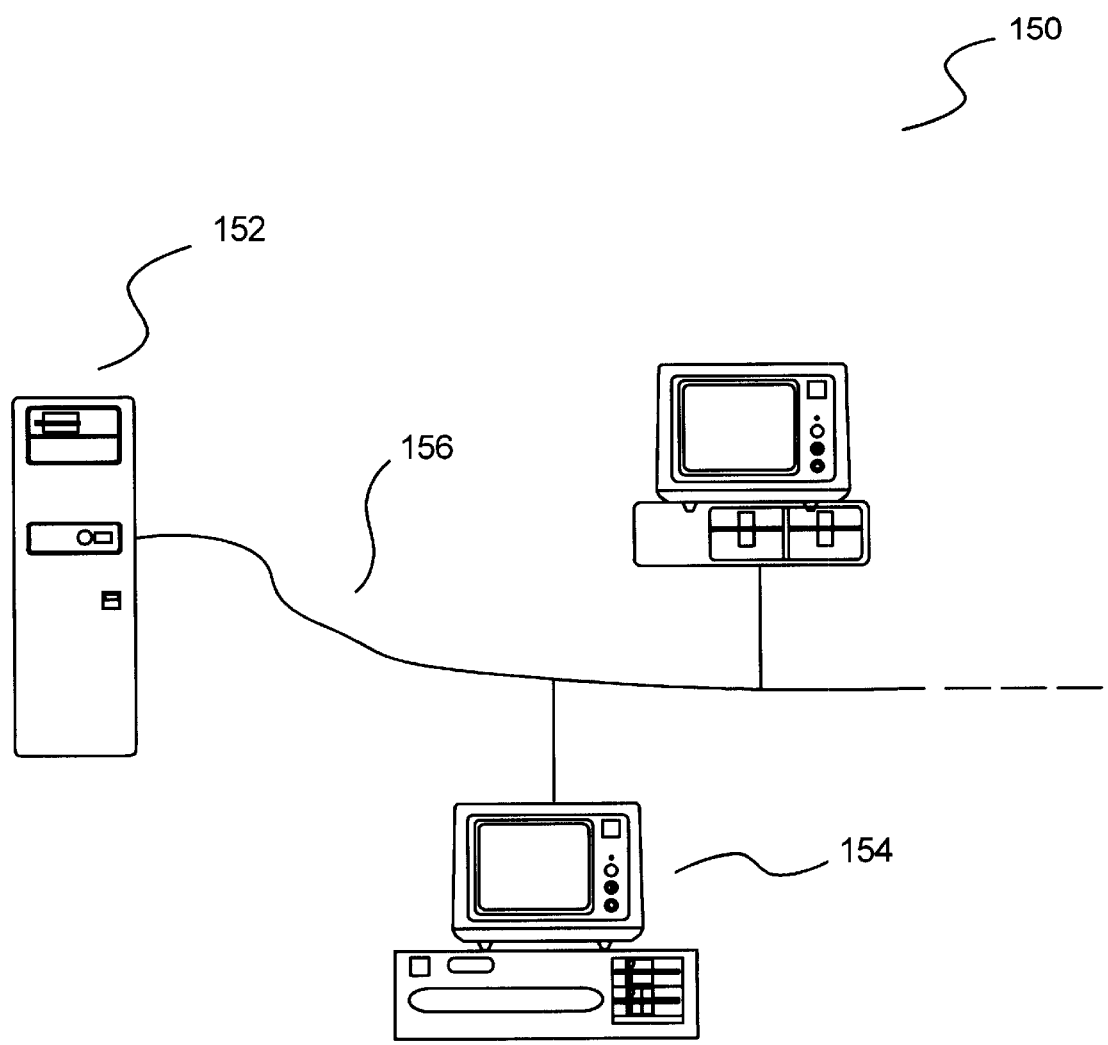
FIGS. 3A–B show a system to implement one embodiment of the present invention.

FIG. 3A shows one physical embodiment 150 implementing one embodiment of the invention, preferably in software and hardware. The embodiment 150 includes a server computer 152 and a number of client computers, such as 154, which can be a personal computer. Each client computer communicates to the server computer 152 through a dedicated communication link, or a computer network 156. In one embodiment, the link can be the Internet, intranet or other types of private-public networks.

Figure 3B:
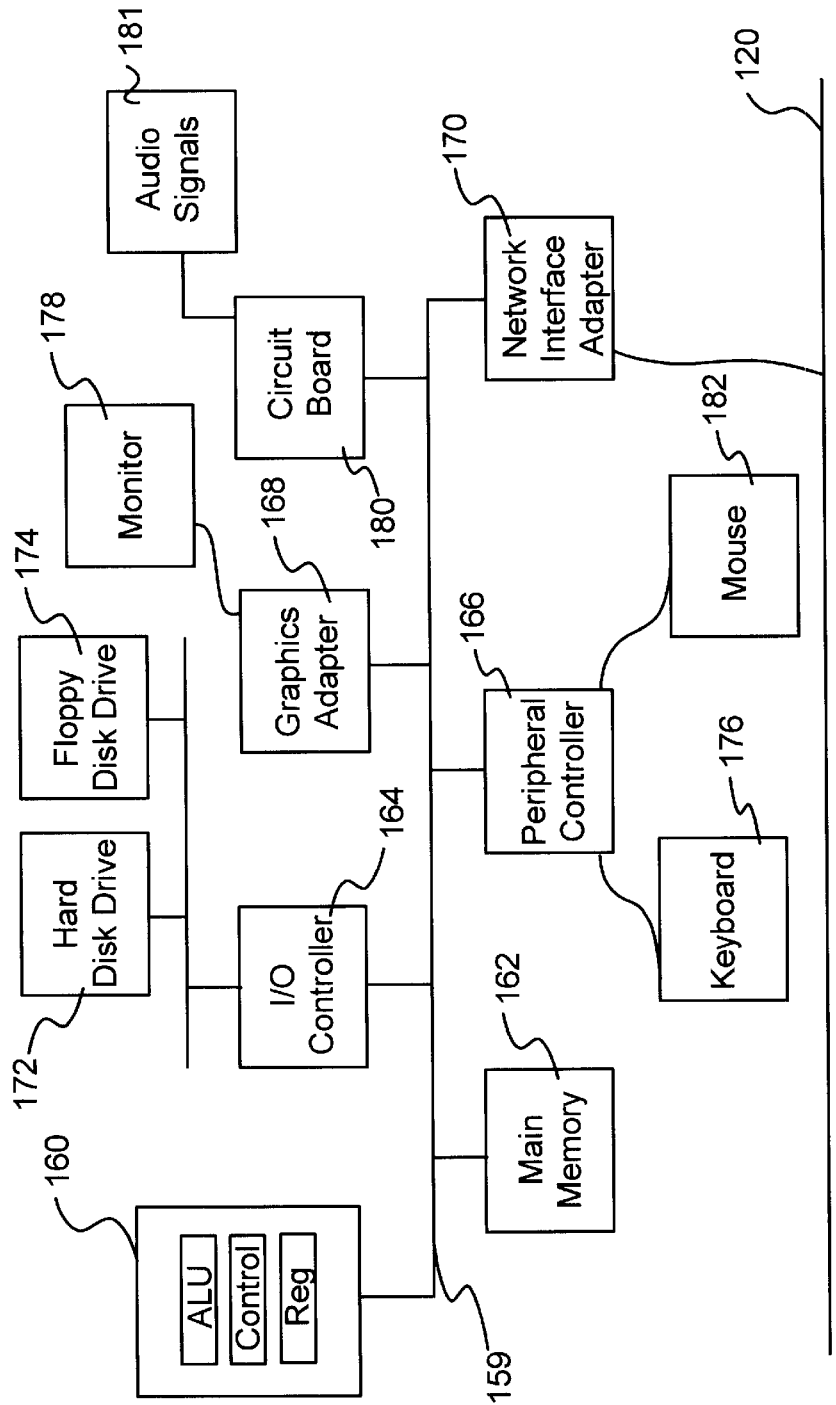

FIG. 3B shows one embodiment of a client computer 154. It typically includes a bus 159 connecting a number of components, such as a processing unit 160, a main memory 162, an I/O controller 164, a peripheral controller 166, a graphics adapter 168, a circuit board 180 and a network interface adapter 170. The I/O controller 164 is connected to components, such as a harddisk drive 172 and a floppy disk drive 174. The peripheral controller 166 can be connected to one or more peripheral components, such as a keyboard 176 and a mouse 182. The graphics adapter 168 can be connected to a monitor 178. The circuit board 180 can be coupled to audio signals 181; and the network interface adapter 170 can be connected to a network 120, which can be the Internet, an intranet, the Web or other forms of networks. The processing unit 160 can be an application specific chip.

Different elements in the system 130 may be in different physical components. For example, the domain determinator, 132, the phrase extractor, 134, the phrase categorizer, 136, the new phrase identifier, 138, and the phrase linker, 140, may be in a client computer; and the databases 142 may reside in a server computer. In another embodiment, even the databases may be in the client computer. In yet another embodiment, the domain determinator, 132, the phrase extractor, 134, the phrase categorizer, 136, the new phrase identifier, 138, the phrase linker, 140, and the databases 142 may reside in a server computer. Some of the elements can also be in a middleware apparatus, such as a Web server. Note also that different portions of an element in FIG. 2 can also reside in different components.

In one embodiment, to process information, initially, a human editor can select a Web site. This can be similar to the editor first selecting a journal for information. All of the documents under that root URL can be retrieved by a crawler and stored in an internal URL storage. All this can be done by one computer, with the crawled information stored in a compact disk and shipped to another computer to be processed.

Then the context or domain of the documents can be determined (Step 102). This can be based on a set of context-definition rules. One rule can be that the context is set by the Web site the document is in. For example, all of the documents under a travel site has the travel context. Another rule can be that the context depends on the related documents hypertext-linked to this document. If more than a pre-determined number, such as 10, or percentage, such as 50%, of documents linked to this site is from travel sites, one rule assumes that this document is also in the context of travel. Determining the context of a document can also be done by a human editor.

Certain general information in the documents may be irrelevant to the determined domain. The document at the root URL can be first analyzed based on one or more general content-exclusion rules to exclude some general irrelevant materials. In one embodiment, one rule is to delete all hyperlinks for image files, such as those ending with GIF, JPEG and MPEG. The un-deleted hyperlinks are stored to have the corresponding documents crawled.

Other content-exclusion rules can depend on the document format and layout. Many Web site designs have uniform layout, such as areas with advertisement and areas containing relevant information to the domain of the Web site. One rule can be that all information in the advertisement sections is not further analyzed. Such a rule can be set by the human editor. For example, the editor can specify that information in certain sections of the form layout in every document under that root URL will be ignored. All of the documents under the root URL can be analyzed based on such general content-exclusion rules.

As explained above, the present invention is applicable to other non-Web-based information. If the documents are from a book, then one exclusion rule can be ignoring the copyright page at the front section of the book.

The documents can also be analyzed based on general content-inclusion rules. These rules are to include certain information in the documents that may not be in the main content section of the documents. One such rule is to identify information in hidden fields, such as metatags in the documents, and to include such information as part of the document. If the invention is applied to a book, information in its table of content can be emphasized because, as to be explained below, they can be used for categorization.

In one embodiment, the phrase extractor, 104, extracts (Step 104) phrases from the remaining documents or portions of the documents. In one embodiment, a phrase can include one or more contiguous words. Examples of phrases can be "public key", "FCC", and "depository institutions deregulation and monetary control act". Note that in some approaches, there can be punctuation within a phrase, such as "Peter O'Toole".

The phrase extractor can use dictionaries and grammatical rules. The dictionaries and grammar rules can describe both the general sentence constructs and domain-specific constructs of the documents. The rules can be based on natural-language processing techniques to parse sentences into grammatical components, such as phrases.

Figure 4:
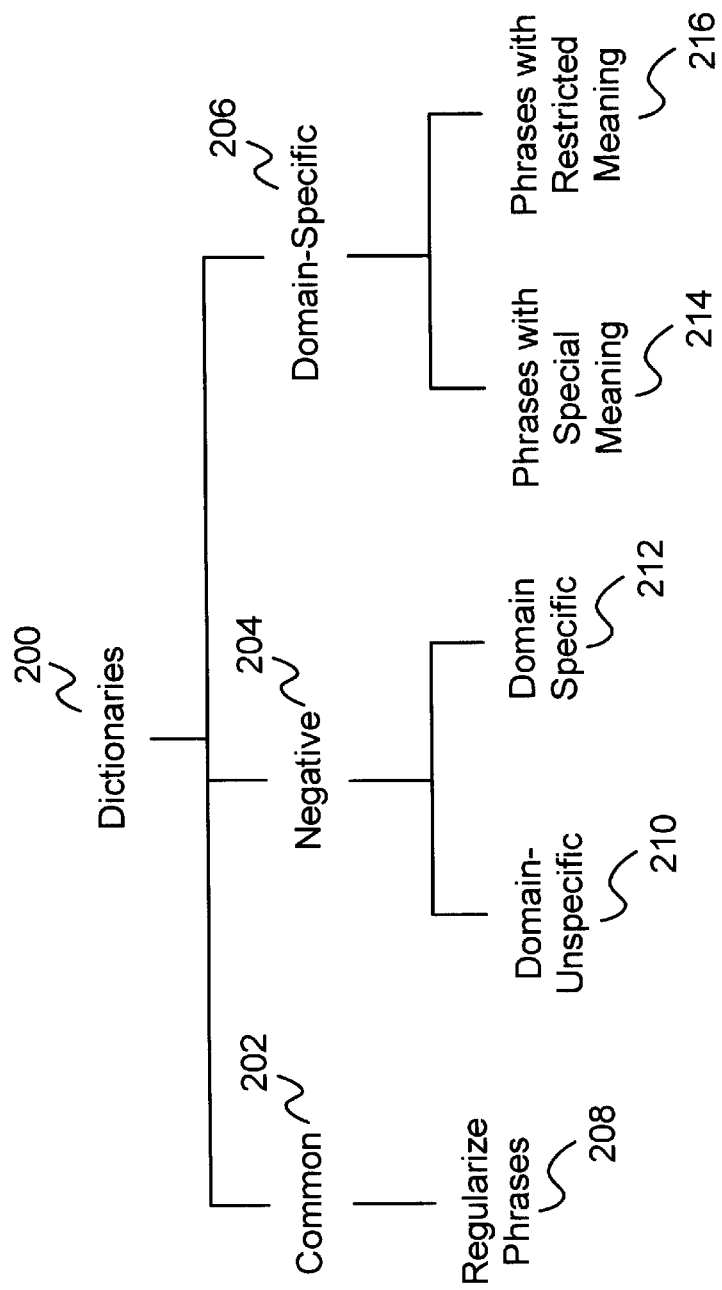
FIG. 4 shows examples of dictionaries for the present invention.

In one embodiment, there are three types of dictionaries, 200, as shown in FIG. 4: A common dictionary, 202, a negative dictionary, 204, and a domain-specific dictionary, 206. They can be stored in the databases 142. A dictionary can be just a large number of words or phrases grouped together.

In one embodiment, the common dictionary, 202, includes commonly-used phrases by the general population and phrases in the domain-specific dictionary. As explained below, the domain-specific dictionary can be regularly updated. Whenever the domain-specific dictionary is updated, the common dictionary, 202, is updated. Based on the common dictionary, words in the document can be regularized, 208, with each word traced to its root. One objective of the regularizing is to reduce the amount of computation required to analyze the document. For example, the word is playing. It can be traced to the word, play. Appendix I describes one way to regularize phrases in the document.

The negative dictionary, 204, includes phrases that should be ignored. In one embodiment, the negative dictionary, 204, is further divided into domain-unspecific negative dictionary, 210, and domain specific negative dictionary, 212. The domain-unspecific negative dictionary includes phrases that are not domain specific and should be ignored. An example of a phrase in this dictionary is "with respect to". The domain-specific negative dictionary includes terms or phrases that are specific to a domain, but should also be ignored. An example of a phrase in this dictionary can be "place" in the domain of travel; it may be related to the domain, but may not be relevant.

The domain-specific dictionary, 206, includes terms or phrases specific or relevant to the domain. They may include terminology used in the domain, acronyms, chemical compounds and other made-up words and jargons. This dictionary may include commonly-used phrases with special meaning, 214, or phrases with restricted meanings, 216, when used in the domain. When such phrases appear in the document, the domain meanings of the phrases apply. For example, if the domain is the Internet, its corresponding domain-specific dictionary should include terms related to the Internet, such as XML. Initially, the domain-specific dictionary, 206, for the Internet can be built by a human editor. This can be done by selecting terms in the index of a number of Internet books to populate the dictionary.

For the grammatical rules to extract phrases, some can be domain specific. For example, if the domain is the construction industry, one grammatical rule may be that no phrases are more than three words, other than proper nouns of names of companies. Another example is a document on mathematics. There are specific grammatical rules applicable only to mathematics, which should be known to those skilled in the art.

Figure 5:
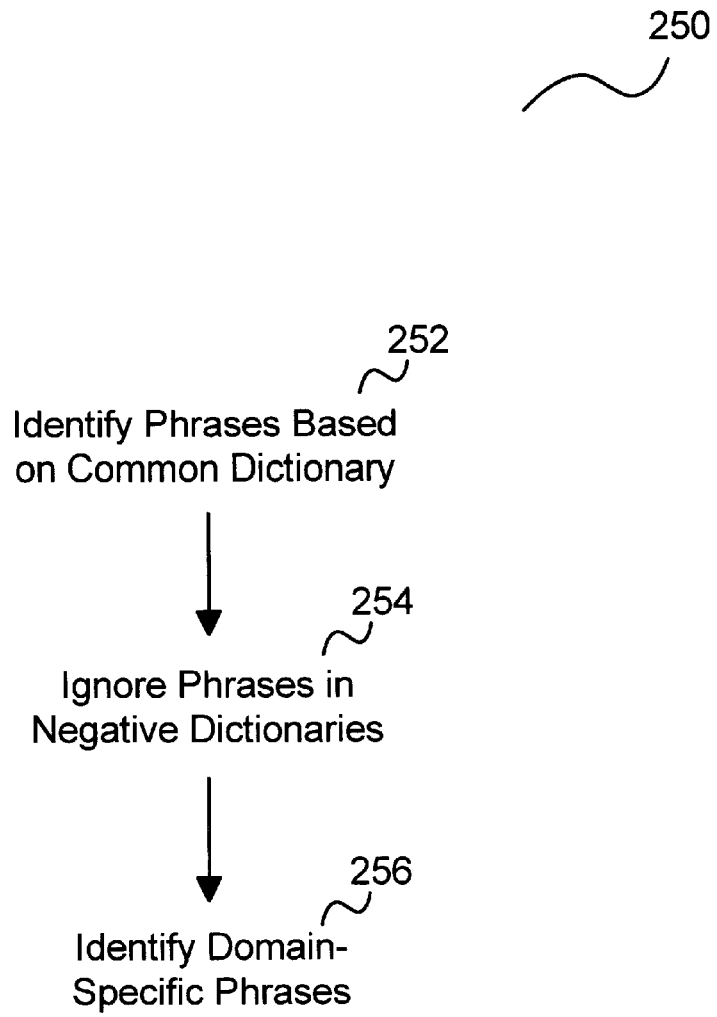
FIG. 5 shows one set of steps to identify relevant phrases in a document using the present invention.

In one embodiment, as shown in FIG. 5, the extractor, 134, identifies phrases in the document. One approach to identify each phrase in the document based on the common dictionary (Step 252) is described below.

In one embodiment, the phrase extractor can identify phrases in the document. It starts by identifying every sentence in the document. In one approach, the following analysis is performed on each sentence.

First, the extractor identifies the first word in the sentence, and then determines if the first word is in the common dictionary. If it is, it will be classified as a phrase of the document.

Then, the extractor identifies the first two words. If there is a corresponding term with such two words in the common dictionary, then the two words are classified as another phrase of the document.

The phrase determination process can be done through a hashing function. One approach is to add the hash values of each of the words in a phrase. If the sum has more than 24 bits, throw away the carry. The remaining 24 bits would be the hash value of the phrase. For example, the two words in the question can be hashed into a hash value, which is compared to hash values in the common dictionary. If such a hash value exists in the common dictionary, then the two words are classified as a phrase. In one embodiment, this process continues on up to the first twenty words in the sentence.

In one embodiment, when a hash value for a certain number of words does not exist, the extractor stops adding another word to identify phrases in the sentence. However, a hash value that exists in the dictionary does not mean that its corresponding word or words can have independent meaning. The existence of a hash value in the dictionary can imply that the phrase extractor should continue on adding words to look for phrases. For example, the extractor should continue on adding words to identify the longest matching phrase, which can be a phrase with six words. For example, the term, "with respect", may not be a phrase, or does not have independent meaning. But the hash value of such a term can be in the dictionary. Then the extractor adds the next word in the question to determine if the three-word combination exists in the dictionary. If the third word is the word "to", then the three-word combination is a preposition with independent meaning, and can have a hash value in the dictionary.

In another embodiment, when a hash value for a certain number of words does not exist, the extractor applies one or more rules to determine whether to continue on or not. One rule is that if the last word is a preposition, the extractor continues to add the next word in the sentence, and classifies the list of words to be a phrase. Another rule is that if the last word in the certain number of words is a pronoun or an article, or if there is a period immediately after the last word, the extractor stops adding another word to identify phrases in the sentence. Yet another rule is that if the last word is capitalized, the extractor keeps on adding words till the word added is not capitalized; the list of words is classified as a phrase.

After identifying all of the phrases from the first word, the extractor starts from identifying phrases from the second word of the sentence, and performs similar identification process as it has done from the first word. One difference is that the starting point of the analysis is the second word.

As an example, the sentence is, "Are ball bearings round?" The extractor starts from the word, "are", and stops after the word, "balls", because there is no hash value for the term, "are ball". Then, the extractor starts from the word, "ball", and finds a hash value. This suggests that the extractor should continue on, and found the hash value for the term, "ball bearings".

The extractor can continue on identifying phrases from the remaining words in the sentence. The starting point of the analysis moves from one word to the next, down the sentence, until all of the words in the sentence have been exhausted.

Then the extractor starts working on the second sentence, and so on, till the last sentence of the document to identify all of the phrases in the document.

In one embodiment, after all of the phrases is identified, each phrase is compared to phrases in both the domain-unspecific and the domain-specific negative dictionaries for ignoring or excluding (Step 254) a number of identified phrases. The remaining phrases are then compared to phrases in the domain-specific dictionary to identify (Step 256) domain-specific phrases. For example, the domain is government, then the phrase, "bills of rights", can be identified as domain-specific phrases.

After comparison to the domain-specific dictionary, there can still be phrases remaining that are not found in the domain-specific dictionary. These phrases can be identified, and can be called new phrases. They are extracted to be further processed as to be explained below.

In one embodiment, after domain-specific phrases are found, the phrase categorizer 136 categorizes (Step 106) them to a categorization hierarchy in the databases.

In one embodiment, in the databases, there are one or more categorization hierarchies. A category can represent a unit of knowledge and can include one or more similar phrases. For example, a category can be points of interest in San Francisco, and phrases under this category can include museums, Exploratorium and Coit Tower. Note that a category can contain a mixture of phrases and other categories.

In another embodiment, each of the phrases in the domain-specific dictionary, 206, belongs to one or more categories.

Figure 6:
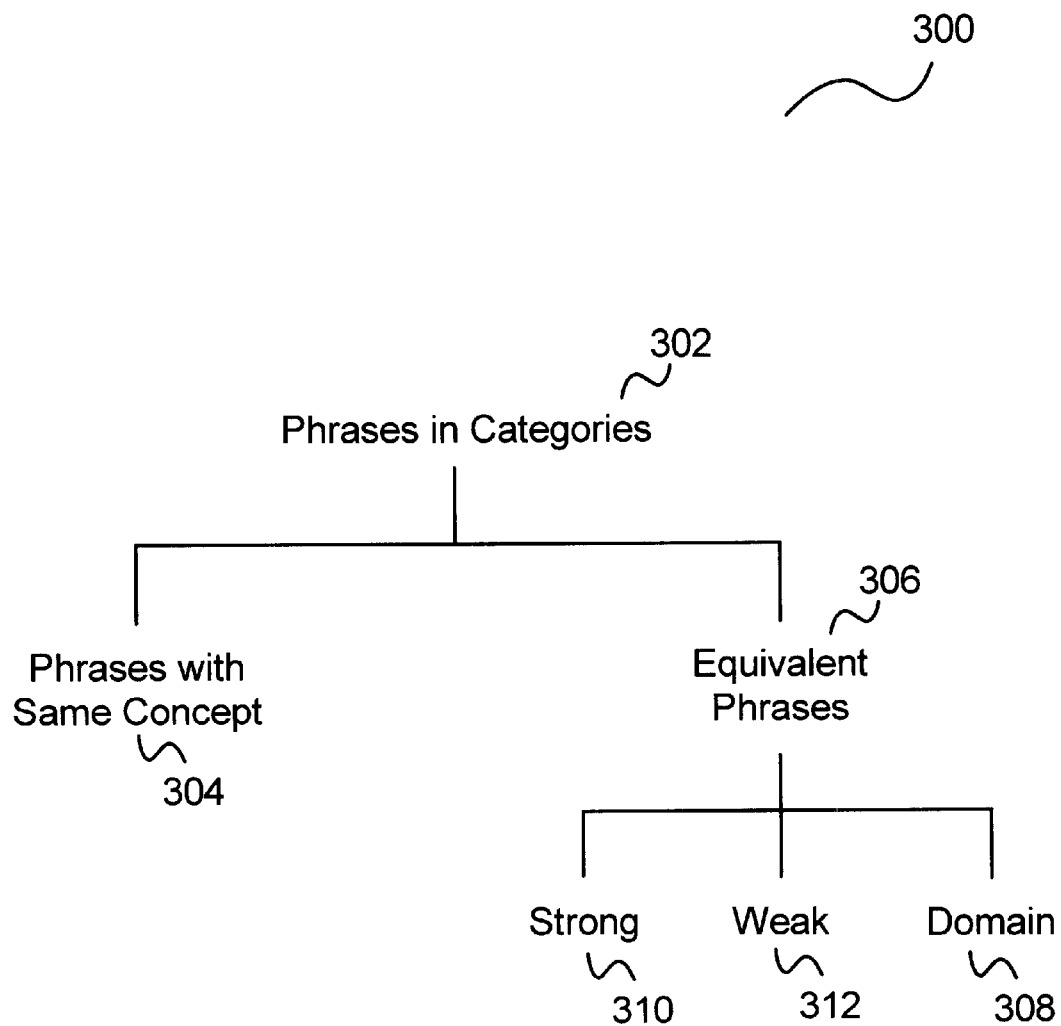
FIG. 6 shows examples of types of phrases grouped together as categories in the present invention.

FIG. 6 shows examples of how phrases are categorized under a category. The grouping of phrases under one category can depend on equivalence, 306, or concept, 304. Equivalent phrases can represent similar knowledge. They can be equivalent representations of the same knowledge, or synonyms of each other. A phrase can be strongly, 310, or weakly, 312, equivalent to another phrase. For example, SF is an abbreviation of San Francisco, and both phrases are strongly equivalent to each other. As another example, dining and dinner are strong equivalent to each other and are within the same category. Equivalents can depend on the domain, 308. ATM is equivalent to the automatic teller machine in the area of finance, but is equivalent to asynchronous transfer mode in the domain of communication. An example of weak equivalent is the phrases, cold and weather.

Phrases having the same concept, 304, can be under one category. For example, all of the Presidents of United States can be within one category. They are related by the concept of the Presidency.

Figure 7:
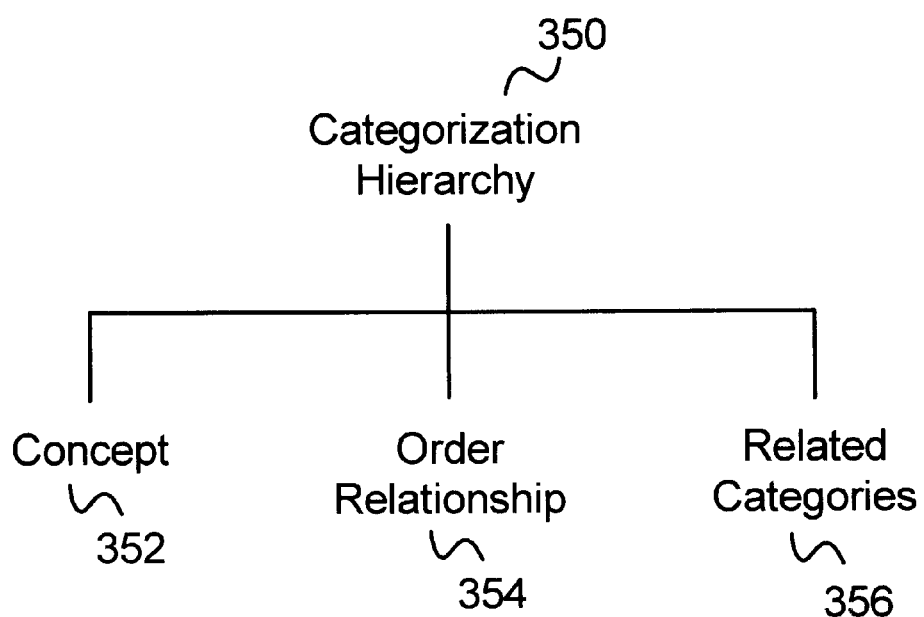
FIG. 7 shows examples of types of categories grouped together in the categorization hierarchy in the present invention.

The categories can be linked together in a hierarchical structure. Such an hierarchy helps the search engine quickly find information. FIG. 7 shows examples of ways on grouping categories together. They can depend on concept, 352, relationship, 356, and order, 354.

Categories with the same concept can be grouped together under a broader category. For example, the Presidents of United States are conceptually related to the Presidents of France. The two sets of information can be grouped together under a broader category of the Presidents of Countries.

Related categories not under the same concept can also be grouped together under a broader category. The relationship can be weak or strong, though two categories are rarely totally equivalent. For example, water and hydrogen are very weakly related, but they are not under the same concept, unless the concept is so broad as to encapsulate all chemical compound.

Another type of category is based on order relationship. In many sentence structures, during normal usage, a certain phrase typically immediately precedes another phrase. For example, points of interest typically appear before a city, such as Russian restaurants in San Francisco. In this example, there can be the category of city information, which can include subcategory of points of interest (such as restaurants, lodging, weather and other areas) and the subcategory of Bay Area Cities (such as San Francisco, Oakland and San Jose). Under a broad category, these two subcategories are linked by order because that is how they can be typically used.

Relating the categories in a hierarchical structure is useful in scaling information and knowledge. It also greatly enhances the rate of searching the categories and their phrases.

Figure 8:
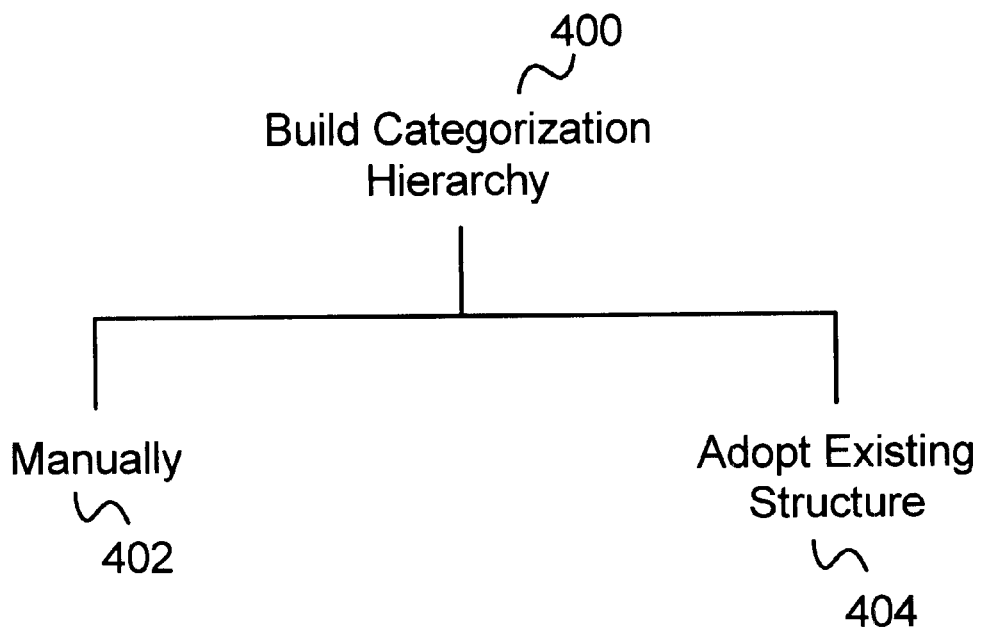
FIG. 8 shows examples of ways to build the categorization hierarchy in the present invention.

FIG. 8 shows some ways, 400, to build the categorization hierarchy. First, it can be built manually, 402. Another way is to adopt existing structures, 404. If one has already categorized its information into a hierarchy, that hierarchy can be used. For example, one would like to categorize all of the documents written in Microsoft Word in a computer. Those documents were previously filed under a hierarchical structure or under the directory structure. That structure can become the categorization hierarchy. In one embodiment, the name of the leaves of that hierarchy may become the phrases in the present invention, and the documents linked to the leaves may become the documents associated with the phrases. In another embodiment, the leaf-directories become the base categories. Any phrase found in a document under a leaf-directory belongs to the corresponding base category. Based on such a categorization hierarchy, users can search for phrases in the Word documents.

Figure 9:
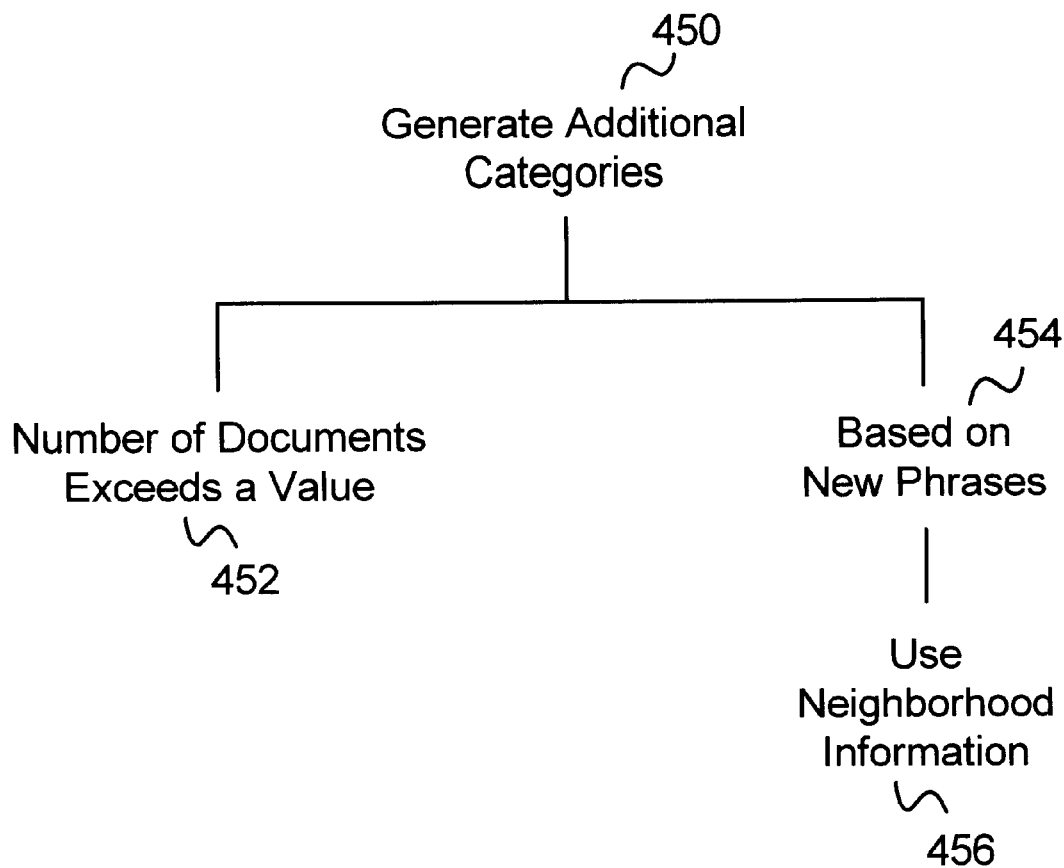
FIG. 9 shows examples of ways to generate additional categories in the present invention.

FIG. 9 shows a number of ways, 450, to generate additional categories. New categories can be generated for a number of reasons. In one embodiment, if a category has too much information, there may not be enough distinction among the information. In one embodiment, a new category will be created when the number of documents linked to it exceeds a predetermined value, 452. As an example, previously the category of Chinese restaurant has no subcategories. Phrases such as dim sum, Shanghai food, Hunan seafood, Peking duck and Szechwan house will all be under the same category. In view of the number of documents linked to this category, new sub-categories are created. The new sub-categories can be based on geographic locations, such as Guangdong, Shanghai, Hunan, Beijing, Sichuan and miscellaneous.

New categories can also be generated in view of new phrases, 454. As explained above, there can be phrases not found in the domain-specific dictionary. These new phrases cannot be automatically mapped to categories in the categorization hierarchy. The document may contain new knowledge, and is tagged. It can then be directed to a human editor specialized in that specific domain.

Figure 10:
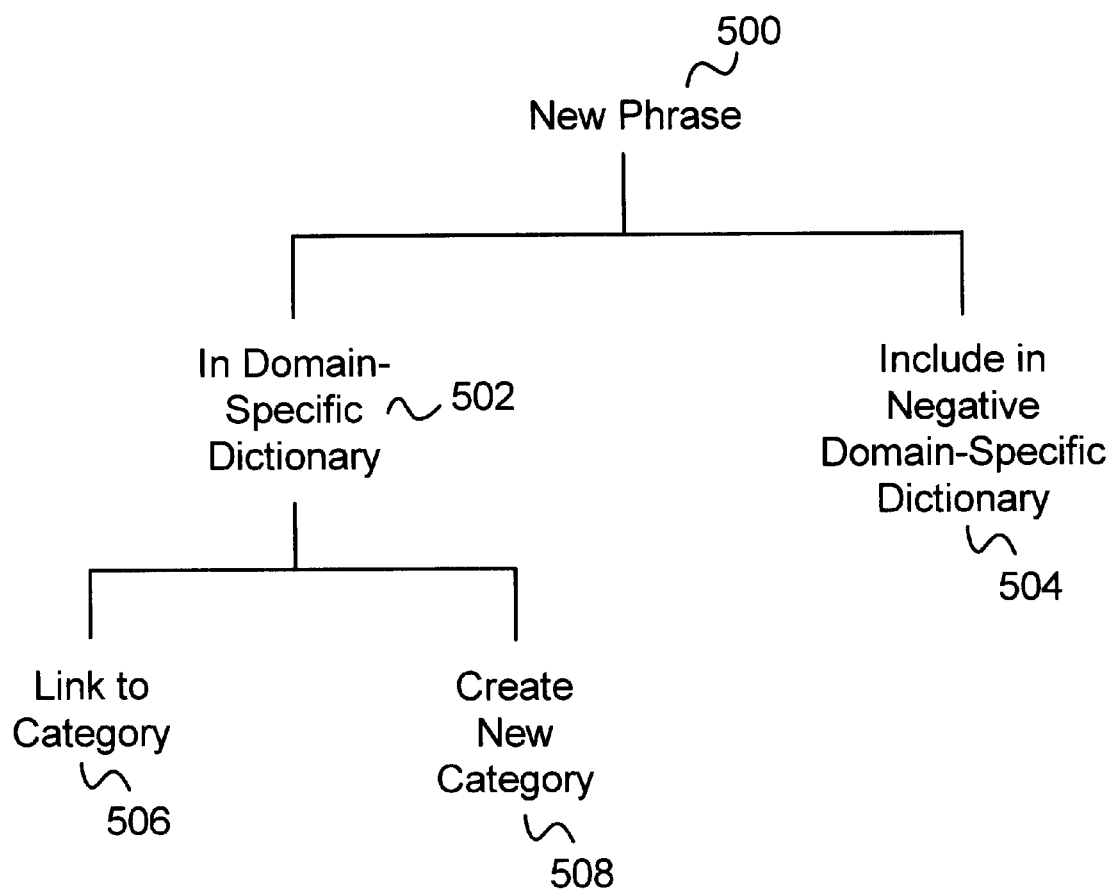
FIG. 10 shows examples of ways to deal with new phrases in the present invention.

FIG. 10 shows some methods to deal with the new phrases. If the editor decides that a new phrase should be in the domain-specific dictionary, 502, she also sets the one or more categories the phrase should be linked to, 506. If it is not appropriate to link the new phrase to any of the existing categories, the editor can introduce, 508, a new category, and decides which existing categories that new category should be tied to. On the other hand, the editor can decide that the new phrase should be included in the negative domain-specific dictionary, 504. Then when the same phrase appears again from another document, that phrase will be excluded from further consideration. As the dictionaries increase in size, the number of new phrases should decrease.

In one embodiment, the identifier, 138, also provides a suggestion to the editor regarding categorizing the new phrases. One suggestion depends on the phrases in the direct vicinity (such as within 50 words) of the new phrases in the document. Those neighboring phrases have their corresponding categories, which can be known as neighboring categories. Such neighboring categories can be presented to the editor to provide suggestions to the editor in categorizing.

Back to the extracted phrases from the document, if an extracted phrase is found under a category of the categorization hierarchy, the location of the document, such as its URL, can be linked (Step 110) to that category. That document can also be represented by a short description.

When that category is accessed in the future, the short description can be presented to the user, with the corresponding document accessed, for example, by clicking or activating that short description. If that phrase is found again under another category, the location of the document can be linked to this second category.

In addition to the document linked to the phrases, in one embodiment, a number of frequently-asked question formats are also linked to the phrases. The document presumably provide answers to the frequently-asked question formats. In another embodiment, when new phrases are categorized, or when new category is created, the editor may also create new frequently-asked question formats for the phrases or category.

Figure 11:
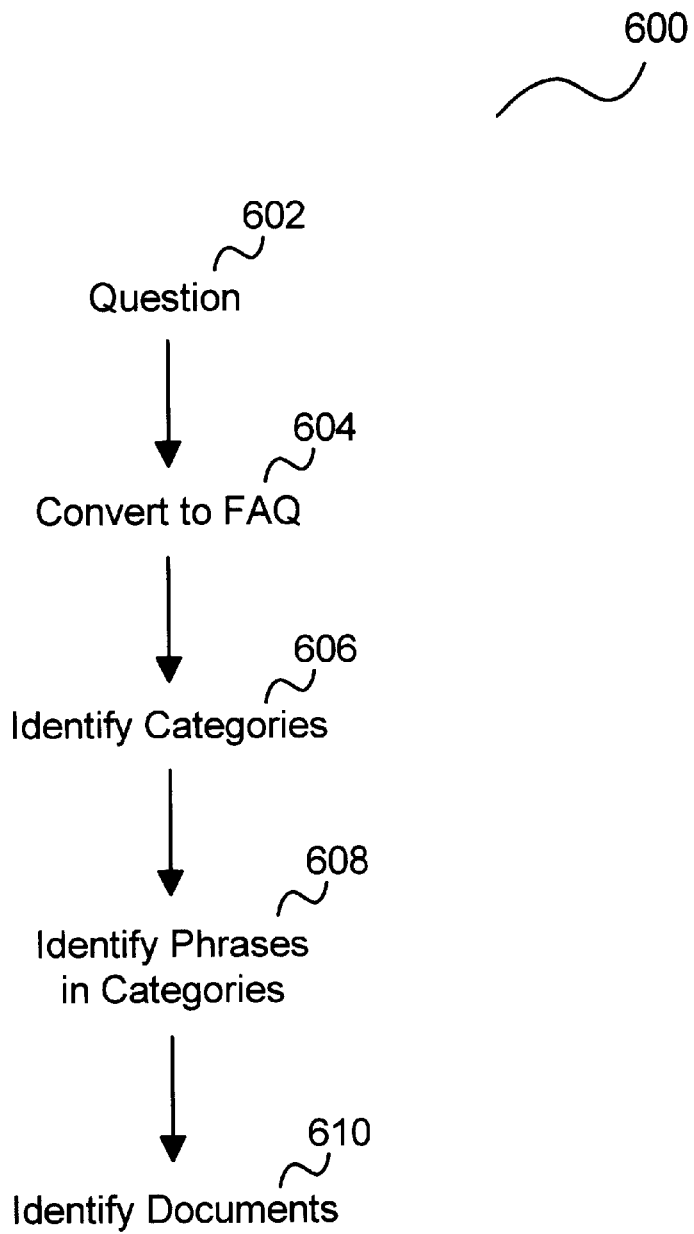
FIG. 11 shows one approach to answer a question using the categories.

The above document processing approaches are applicable to answering users' questions. FIG. 11 shows one way to respond to a user's question, 602, using the present invention. It depends on linking the question to one or more frequently-asked-question formats, and to link the formats to categories.

The search engine can convert the user's question into one or more frequently-asked-question formats, 604. For example, in the domain of travel, one commonly-asked question is in the format of "Where is X?", with X being a city name. All questions, such as "Where is San Jose?" and "Where is New York", can be converted to the frequently-asked question format of "Where is X?". Then, the search engine identifies, 606, the categories that link to the frequently-asked-question formats. In view of the categorization hierarchy, such identification can be quite efficient.

Based on the question, there can be rules to identify phrases, 608, within the identified categories. As an illustration, the question can have modifiers, or words that describe further details about a concept. For example, the modifier "first" when applied to the category "President of the United States" identifies the first phrase in the category, and selects "George Washington." Another rule depends on attributes within a category. For example, the category of "Restaurants in San Francisco" has thousands of entries. These entries can be grouped based on ethnicity attributes. The modifier "Italian" in the question identifies the set of phrases with the ethnic attribute of "Italian".

Once a phrase is found, a document linked to it can be identified, 610, and extracted to answer the question. In one embodiment, the root URL or the source of the document is also identified with the document. Whether that document is retrieved or not depends also on the source of that document. In one embodiment, if a user is at the Web site of the root URL, and asks a question. A number of documents are identified to respond to the question, with at least one document having its root URL being that Web site. In one approach, that document is presented to the user, or has a higher priority of being presented. In other words, the categorizer can link that document with the source of the document such that whether the document is retrieved by the search engine to be presented to the user can depend on the source of the document.

The frequently-asked-question format approach can address many questions. However, there may some questions that might have to be answered through directly querying the databases. In one embodiment, certain questions are answered through such direct querying.

The present invention is also applicable to human learning, especially in helping a student learn materials related to the domain, and learn information related to the new phrases. The editor can be replaced by a student, and the categorization hierarchy can be her knowledge filing system.

In one embodiment, the student has been studying materials related to a subject domain. As the student works on the materials, she starts creating a filing system, categorizing what she has been learning. The system 100 is aware of the filing system. The student identifies a new root URL on the subject domain. The system 100 automatically categorizes documents under the root URL to the filing system. If a document or phrases are in an area she has learnt before, they will be automatically and systematically filed to her filing system.

New information or phrases, automatically identified, are referred to her to be learned. The system 100 can extract materials in the vicinity of the new phrases to be presented to her for learning. After learning, she can be suggested as to where to file the information in her existing filing system. In other words, she can link the information to what she has learnt before. Such systematic and logical learning approaches significantly help her organize new information, which, in turn, enhances knowledge retrieval in time of needs.

This invention describes one approach to identify new phrases in a document. In another embodiment, new phrases are identified during the phrase extraction process. For example, when a hash value for a certain number of words does not exist, based on one or more rules, such as those previously discussed, the extractor determines to continue adding words. The phrase identified can be classified as a new phrase. They can be categorized into a categorization hierarchy, for example, by processes as explained above.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

Appendix I: One Way to Regularize Phrases in the Document

A document regularizer regularizes words or phrases in the document, for example, by tracing certain words in the document to their roots. In one embodiment, the traced words are also replaced by their roots. The following is on one approach to replace words by their roots.

In one embodiment, a regularizer identifies every word in the document. Then it replaces words with their roots if they are not already in their root forms. For example, the regularizer changes verbs of different forms in the document into their present tense, and nouns into singular.

One approach to implement the replacement process is based on a hashing function. Every word in the document can be hashed into a hash value. In one embodiment, each character is represented by eight bits, such as by its corresponding eight-bit ASCII codes. The hashing function is performed by first pairing characters together in every word of the document. If a word has an odd number of characters, then the last character of the word is paired with zero. Each paired characters becomes a sixteen-bit number. Every word could have a number of sixteen-bit numbers. The character does not have to be represented by the eight-bit ASCII codes. In another embodiment, with each character represented by its sixteen-bit unicode, the characters are not paired. Again every word could have a number of sixteen-bit numbers.

For a word, add all of its sixteen-bit numbers, and represent the sum by a thirty-two bit number. For the thirty-two bit number, add the first two bytes and throw away the carry to generate a twenty-four bit number. This number is the hash value of the word. In one embodiment, each hash value can be used to represent two different words. One word can be in one language and the other in another language, with both languages represented by unicodes. A 16 Mbit memory could be used to hold different combinations of twenty-four bit hash values to represent different words. This approach is applicable to most natural languages.

In one embodiment, commonly-used words have been previously hashed and stored in the common dictionary. There are also tables generated that link the hash values of those words with the hash values of their root forms. Then, the hash values of words in the document are compared to hash values in the tables and may be replaced by root-form hash values. For example, the hash values of verbs of different forms in the document are mapped to and replaced by the hash values of their present tenses. Similarly, the hash values of plural nouns are mapped to and replaced by their corresponding singular form hash values.

What is claimed is:

1. A method to process a document from a Web site, based on a categorization hierarchy which has a plurality of categories, each category including one or more phrases, the method comprising:

extracting phrases from the document;

categorizing at least one of the extracted phrases under a category of the categorization hierarchy; and identifying at least one of the extracted phrases that cannot be categorized into the categorization hierarchy for analysis;

such that information in the document can be appropriately categorized and the document can be systematically retrieved by a natural language responding engine when needed;

wherein the location of the document is related to a URL;

wherein the document includes at least an image when the document is displayed on the Web site, and the method includes not categorizing the image; and wherein the document includes at least a phrase that is hidden when the document is displayed on the Web site, and the method includes extracting that phrase for categorizing.

2. A method as recited in claim 1 further comprising determining the domain of the document.

3. A method as recited in claim 1 wherein the document is related to a domain.

4. A method as recited in claim 3 wherein the extracting phrases depends on a negative dictionary such that phrases in the negative dictionary will not be extracted from the document for categorizing.

5. A method as recited in claim 4 wherein the negative dictionary includes phrases that are specific to the domain, and phrases that are not specific to the domain.

6. A method as recited in claim 1 further comprising providing a suggestion on categorizing the phrase that cannot be categorized.

7. A method as recited in claim 1 wherein a new category is created in view of the phrase that cannot be categorized.

8. A method as recited in claim 3 wherein the method enables a user to learn materials related to the domain, and to learn information related to the identified phrases.

9. A method as recited in claim 1 wherein whether the document is retrieved by the natural language responding engine to be presented to a user depends on the source of the document.

10. A method as recited in claim 1 wherein:

a first phrase is related to a first category;

a second phrase is related to a second category; and if the first phrase precedes the second phrase in normal usage, then the first category and the second category are grouped together in the categorization hierarchy.

11. An apparatus to process a document from a Web site, based on a categorization hierarchy, which has a plurality of categories, each category including one or more phrases, the apparatus comprising:

an extractor configured to extract phrases from the document;

a categorizer configured to categorize at least one of the extracted phrases under a category of the categorization hierarchy; and an identifier configured to identify at least one of the extracted phrases that cannot be categorized into the categorization hierarchy for analysis;

such that information in the document can be appropriately categorized and the document can be systematically retrieved by a natural language responding engine when needed; and wherein the location of the document is related to a URL;

wherein the document includes at least an image when the document is displayed on the Web site, and the method includes not categorizing the image; and wherein the document includes at least a phrase that is hidden when the document is displayed on the Web site, and the method includes extracting that phrase for categorizing.

12. An apparatus as recited in claim 11 further comprising a domain determinator configured to determine the domain of the document.

13. An apparatus as recited in claim 11 wherein the document is related to a domain.

14. An apparatus as recited in claim 13 wherein the extractor uses a negative dictionary such that phrases in the negative dictionary will not be extracted from the document for categorizing.

15. An apparatus as recited in claim 14 wherein the negative dictionary includes phrases that are specific to the domain, and phrases that are not specific to the domain.

16. An apparatus as recited in claim 11 further comprising an identifier configured to provide a suggestion on categorizing the phrase that cannot be categorized.

17. An apparatus as recited in claim 11 wherein a new category is created in view of the phrase that cannot be categorized.

18. An apparatus as recited in claim 13 wherein the apparatus enables a user to learn materials related to the domain, and to learn information related to the identified phrases.

19. An apparatus as recited in claim 11 wherein whether the document is retrieved by the natural language responding engine to be presented to a user depends on the source of the document.

20. An apparatus as recited in claim 11 wherein:

a first phrase is related to a first category;

a second phrase is related to a second category; and if the first phrase precedes the second phrase in normal usage, then the first category and the second category are grouped together in the categorization hierarchy.

* * * * *